United States Patent
Nanaumi et al.

(10) Patent No.: US 8,443,873 B2
(45) Date of Patent: May 21, 2013

(54) HEAT EXCHANGER FOR VEHICULAR AIR CONDITIONING APPARATUS

(75) Inventors: Kyosuke Nanaumi, Tochigi-ken (JP); Takahiro Seto, Utsunomiya (JP); Tsunetoshi Kitamura, Utsunomiya (JP); Shinji Kakizaki, Dublin, OH (US); Junichi Kanemaru, Columbus, OH (US)

(73) Assignees: Keihin Corporation, Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/629,352

(22) Filed: Dec. 2, 2009

(65) Prior Publication Data

US 2011/0127009 A1    Jun. 2, 2011

(51) Int. Cl.
  *F25B 29/00*    (2006.01)
  *B60H 1/00*    (2006.01)

(52) U.S. Cl.
  USPC ............... 165/202; 165/203; 165/42; 165/43; 454/156; 454/160; 454/161; 237/12.3 A; 237/12.3 B

(58) Field of Classification Search
  USPC .............. 165/42, 43, 202, 203; 454/156, 160, 454/161; 237/12.3 A, 12.3 B
  See application file for complete search history.

(56) References Cited

U.S. PATENT DOCUMENTS

| | | | |
|---|---|---|---|
| 4,559,994 A * | 12/1985 | Waldmann et al. | 165/41 |
| 5,309,731 A | 5/1994 | Nonoyama et al. | |
| 6,202,741 B1 * | 3/2001 | Demuth et al. | 165/176 |
| 6,308,770 B1 * | 10/2001 | Shikata et al. | 165/42 |
| 6,311,763 B1 * | 11/2001 | Uemura et al. | 165/43 |
| 6,422,309 B2 * | 7/2002 | Vincent | 165/204 |
| 6,427,770 B2 * | 8/2002 | Beck et al. | 165/203 |
| 2007/0023180 A1 * | 2/2007 | Komarek et al. | 165/202 |

FOREIGN PATENT DOCUMENTS

| | | | |
|---|---|---|---|
| DE | 10250287 C1 * | 11/2003 | |
| EP | 632245 A1 * | 1/1995 | |
| JP | 55068416 A * | 5/1980 | |
| JP | 07164863 A * | 6/1995 | |
| JP | 07318288 A * | 12/1995 | |
| JP | 09207543 A * | 8/1997 | |
| JP | 10029424 A * | 2/1998 | |
| JP | 2003-336991 | 11/2003 | |

* cited by examiner

Primary Examiner — John Ford
(74) Attorney, Agent, or Firm — Rankin, Hill & Clark LLP

(57) ABSTRACT

In a heater core that constitutes part of a vehicular air conditioning apparatus, a plurality of first and second tubes are provided through which heated water flows through the interior thereof, and fins having louvers therein are disposed between the first and second tubes. Further, the heater core is equipped with a first heating section, which faces toward a first front passage through which air from a first blower unit flows, and a second heating section, which faces toward a first rear passage through which air from a second blower unit flows. Between the first heating section and the second heating section, a partitioning fin is disposed for blocking communication of air mutually between the first and second heating sections. Additionally, the first and second tubes are arranged in parallel to the direction in which the partitioning fin extends.

12 Claims, 9 Drawing Sheets

HEAT EXCHANGER FOR VEHICULAR AIR CONDITIONING APPARATUS

BACKGROUND OF THE INVENTION

1. Field of the Invention

The present invention relates to a heat exchanger, which is installed in a vehicular air conditioning apparatus that performs temperature adjustment of a vehicle compartment, whereby the heat exchanger is used by the vehicular air conditioning apparatus for heating air that is blown into the vehicle compartment.

2. Description of the Related Art

A vehicular air conditioning apparatus, which is mounted in a vehicle, for example, is equipped with a first blower for drawing in internal and external air with respect to the vehicle into a casing, and a second blower for drawing in air from the vehicle interior into the casing. In this case, for example, air that is introduced from an external air introduction port by rotation of the first blower is heated by a heat exchanger, passes through a first air passage, and is blown toward the front seats in the vehicle compartment from a blow-out port. Together therewith, air that is introduced from an internal air introduction port by rotation of the second blower, after being heated by the heat exchanger, passes through a second air passage and is blown out toward the rear seats.

This type of heat exchanger for use in a vehicular air conditioning apparatus comprises a pair of tanks disposed on upper and lower sides of the heat exchanger, and heat exchanger passages connected between the tanks and through which a medium for carrying out heat exchange flows. A pair of conduits for supplying and discharging the medium with respect to the heat exchanger passages are connected respectively to the tanks.

In addition, for example, utilizing the heat exchanger 1 shown in FIG. 9A, as disclosed in Japanese Laid-Open Patent Publication No. 2003-336991, the medium (e.g., hot water) supplied from one of the conduits positioned on a downward side is supplied into the heat exchanger passage 3 from one of the tanks 2a, and after flowing upwardly therethrough, passes through the other tank 2b positioned on the upper side and is discharged to the exterior from the other conduit. At this time, heat exchange is carried out on the air that passes through the heat exchanger 1, whereupon air that has undergone heat exchange is supplied downstream. Further, with the heat exchanger 4 shown in FIG. 9B, the center of the heat exchanger passage 5 is divided, and conduits are connected respectively to both sides of one of the tanks 6a disposed on a lower portion thereof. A medium (e.g., hot water) supplied to the one tank 6a from one of the conduits disposed on the righthand side rises upwardly in the interior of a heat exchanger passage toward the side of the other tank 6b. At the tank 6b, after having flowed therethrough in a leftward direction, the medium passes by the lefthand side of the divided heat exchanger passage 5 and proceeds to flow downward, and after passing again through the first tank 6a, the medium is discharged through the other conduit disposed on the lefthand side.

The above-described heat exchanger is applied to a vehicular air conditioning apparatus equipped with two first and second blowers, which are capable of blowing air independently to the front and rear seats in the vehicle compartment. In this case, it is conceived that the heat exchanger is disposed so as to straddle between a first air passage and a second air passage, whereby the air that flows through the first and second air passages can be adjusted in temperature independently.

However, with this type of vehicular air conditioning apparatus, for example, in the event that external air (air) is taken in by the first blower in an environment where the outside air temperature is low, when such air is heated by the heat exchanger via the first air passage, the hot water, which serves as the heat exchange medium, is cooled by the low temperature external air. Because a structure exists in which the hot water, which has been lowered in temperature, is circulated through the heat exchanger and flows through the region over which air supplied from the second air passage passes, the air supplied from the second blower cannot be heated to a predetermined temperature by the hot water medium, which has been cooled. More specifically, air that flows through the second air passage is influenced by the low temperature air (external air) that is introduced through the first air passage, and such air cannot be heated to a predetermined temperature. Since the temperature of air that passes through the second air passage and is blown toward the rear seats inside the vehicle compartment is lowered, there is a concern that the comfort of passengers in the vehicle will be adversely affected.

SUMMARY OF THE INVENTION

A general object of the present invention is to provide a heat exchanger for use in a vehicular air conditioning apparatus. In particular, in a vehicular air conditioning apparatus which is capable of blowing air independently to front and rear seat sides of the vehicle utilizing two separate blowers, even in the case that external air is drawn in by one of the blowers, air that is supplied to the interior of the vehicle by the other blower can be blown at a stable predetermined temperature, thereby enabling the comfort of passengers in the vehicle to be improved.

To achieve the aforementioned object, the present invention is characterized by a heat exchanger for use in a vehicular air conditioning apparatus having a casing including first and second passages through which air flows, a damper mechanism for switching the flow state of air in the first passage and the second passage, and first and second blowers for supplying air respectively to the first and second passages, and further wherein a heat exchanger is disposed in the interior of the casing so as to straddle between the first passage and the second passage for thereby heating and supplying the air. The heat exchanger comprises a first medium passage facing toward an upstream side of the first and second passages and through which a medium flows through the interior thereof, a second medium passage, which is parallel to the first medium passage and faces toward a downstream side of the first and second passages, and through which the medium flows through the interior thereof, a communication section disposed at ends of the first and second medium passages for establishing communication between the first medium passage and the second medium passage, a first heat exchanger section which performs heat exchange on the air that flows through the first passage, a second heat exchanger section which performs heat exchange on the air that flows through the second passage, and a partitioning member disposed between the first heat exchanger section and the second heat exchanger section, for blocking communication of the air between the first heat exchanger section and the second heat exchanger section, wherein the partitioning member is disposed in parallel with the first and second medium passages.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
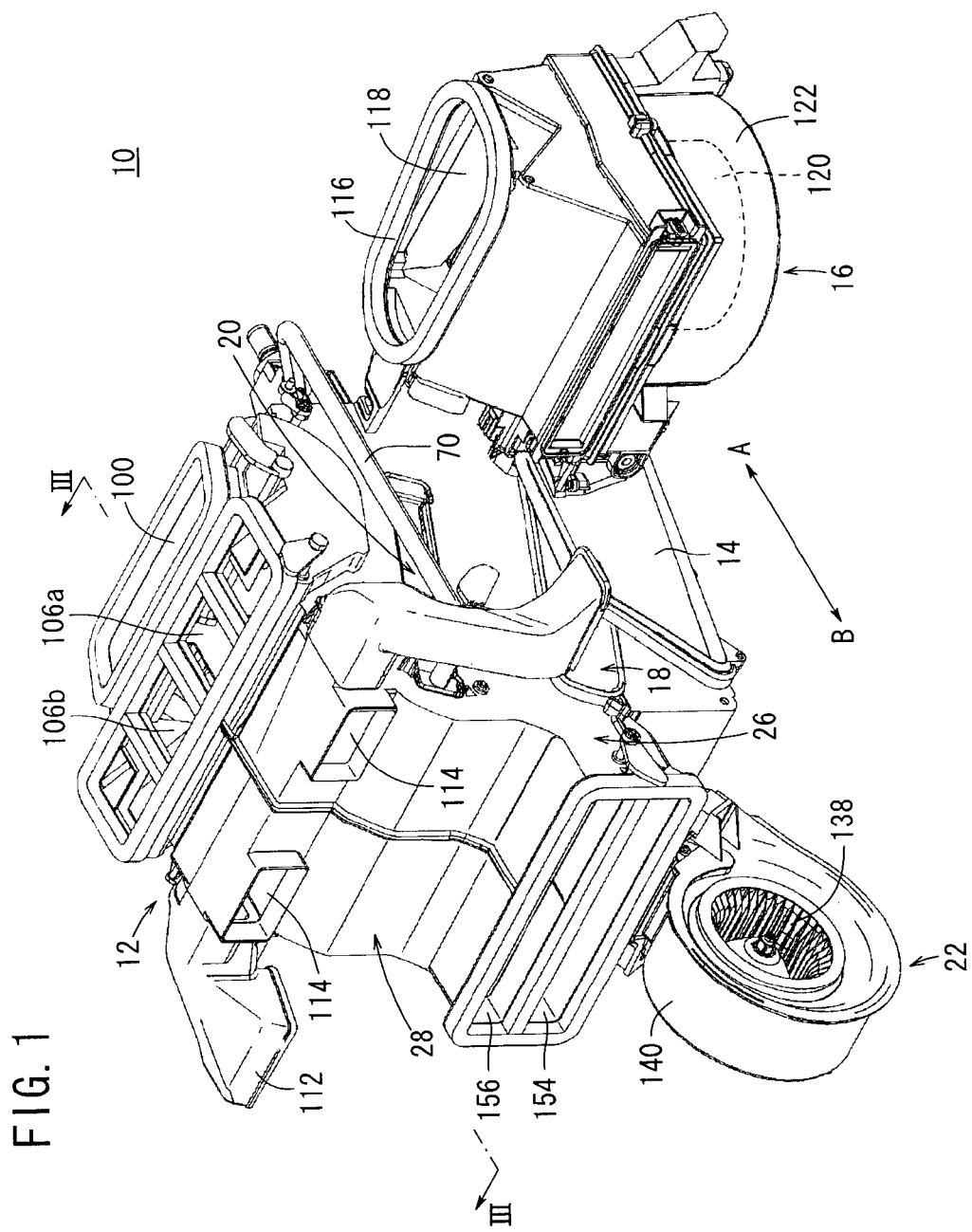
FIG. 1 is an external perspective view of a vehicular air conditioning apparatus according to an embodiment of the present invention.
Figure 2:
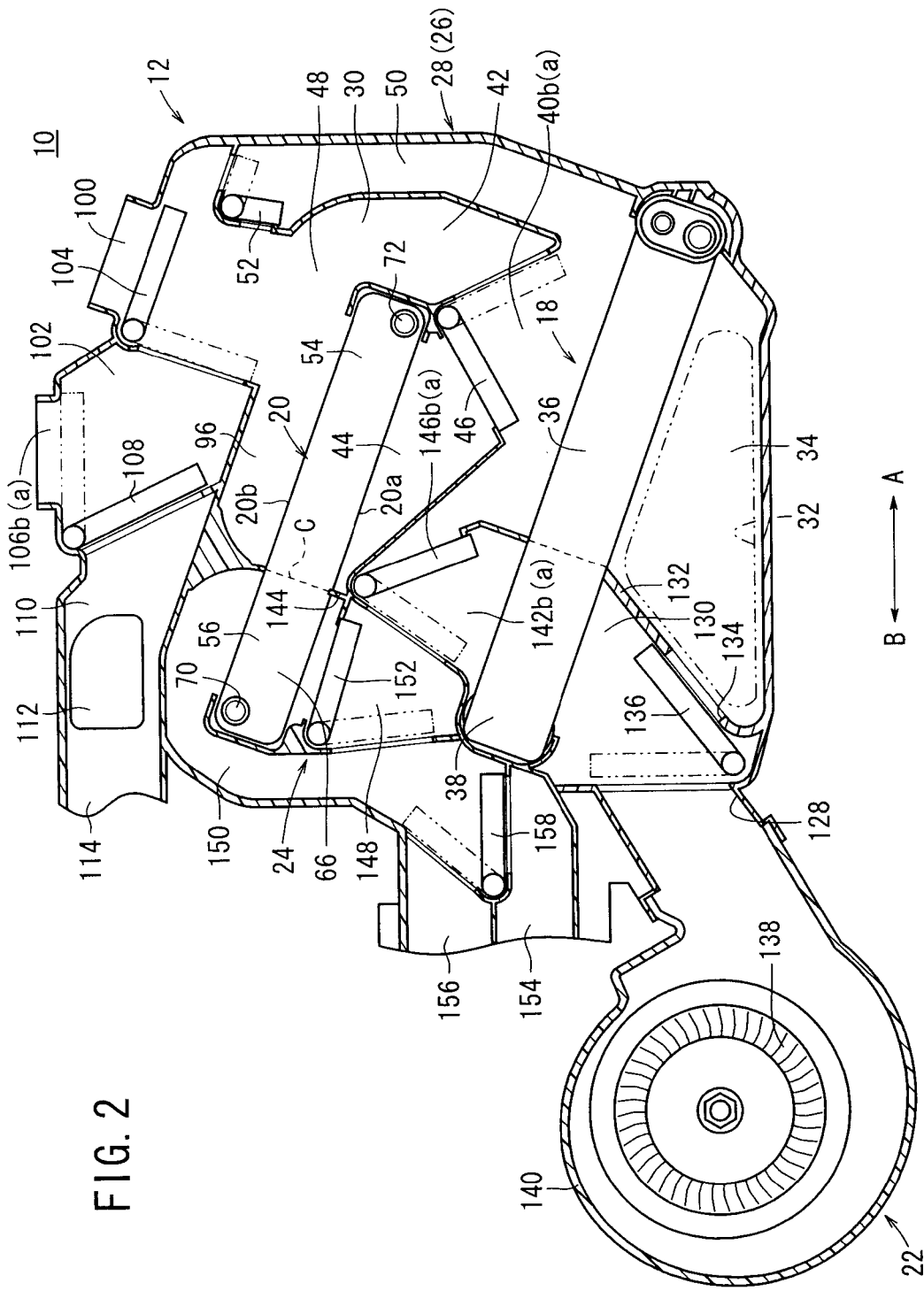
FIG. 2 is an overall cross sectional view of the vehicular air conditioning apparatus shown in FIG. 1.
Figure 3:
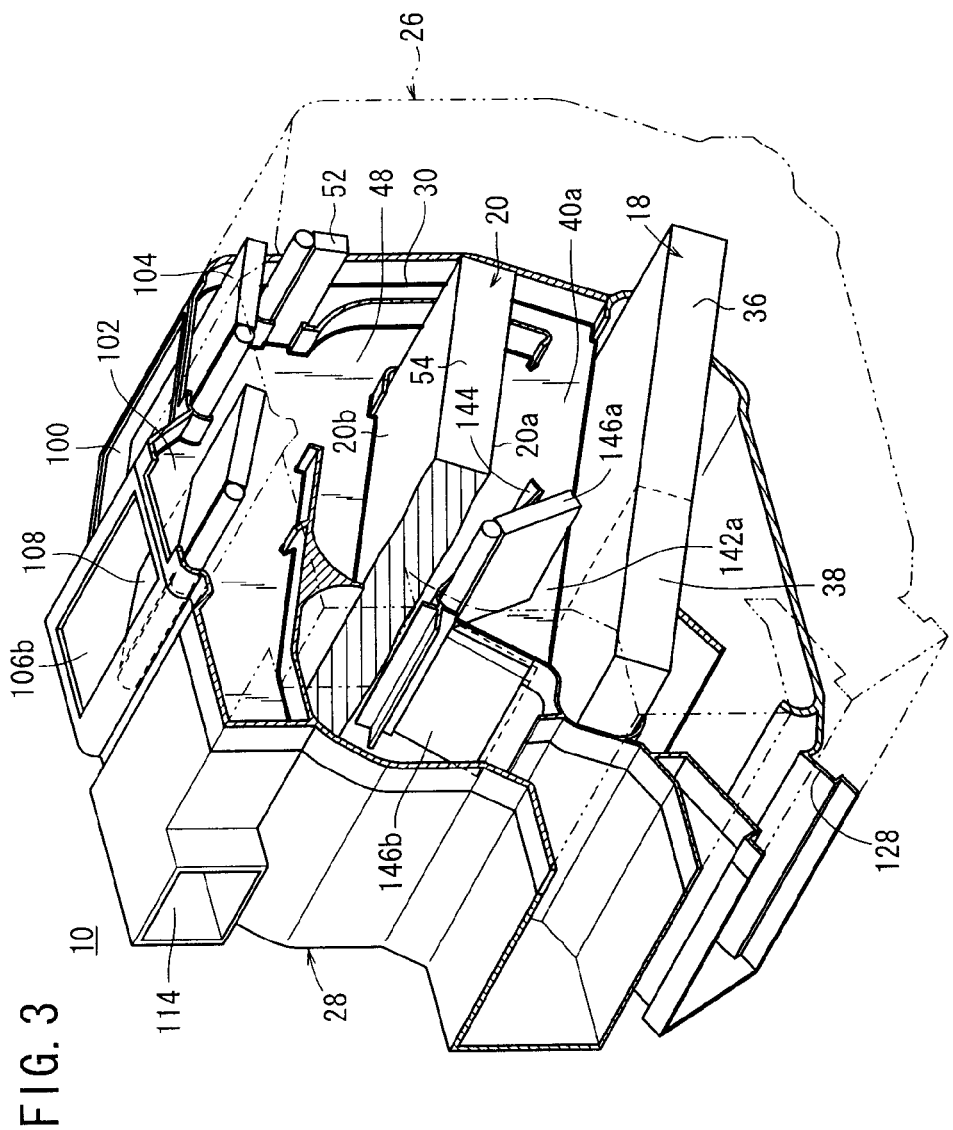
FIG. 3 is a cross sectional perspective view taken along line III-III of FIG. 1.

As shown in FIGS. 1 through 3, a vehicular air conditioning apparatus 10 includes a casing 12 constituted by respective air passages, a first blower unit 16 connected through a connection duct 14 to a side portion of the casing 12 for blowing out air toward a front seat side of the vehicle, an evaporator 18 arranged inside the casing 12 for cooling air, a heater core (heat exchanger) 20 for heating air, a second blower unit 22 connected to a lower portion of the casing 12 for taking in air from inside the vehicle compartment (interior air) and blowing the air toward the rear seats of the vehicle, and a damper mechanism 24 for switching the flow of air that flows through and inside each of the respective passages.

The vehicular air conditioning apparatus 10, for example, is installed in a vehicle having three rows of seats arranged along the direction of travel of the vehicle. In the following descriptions, the first row of seats in the vehicle compartment of the vehicle is designated as front seats, the second row of seats is designated as middle seats, and the third row of seats is designated as rear seats.

Further, the vehicular air conditioning apparatus 10 is installed so that the right-hand side thereof shown in FIG. 2 (in the direction of arrow A) is oriented toward the front side of the vehicle, whereas the left-hand side (in the direction of arrow B) is oriented toward the rear side of the vehicle. The arrow A direction shall be described as a forward direction, whereas the arrow B direction shall be described as a rearward direction.

Furthermore, in the present embodiment, inside the casing 12, plural rotating members made up of dampers or the like are provided, wherein the rotating members are operated by rotational drive sources such as motors or the like. For purposes of simplification, depictions and explanations concerning such rotational drive sources have been omitted.

The casing 12 is constituted by first and second divided casings 26, 28 having substantially symmetrical shapes, wherein a center plate 30 is disposed between the first divided casing 26 and the second divided casing 28. The connection duct 14 is connected on a lower side portion of the first divided casing 26, and a first intake port 32 is formed through which air is supplied from the first blower unit 16. The first intake port 32 communicates with a first front passage 34 disposed on an upstream side of the evaporator 18.

The evaporator 18 is disposed so as to straddle between the first divided casing 26 and the second divided casing 28. One end of the evaporator 18 in the forward direction (the direction of arrow A) of the vehicle is inclined downward at a predetermined angle with respect to the other end thereof in the rearward direction of the vehicle.

The evaporator 18 includes a first cooling section 36 that faces toward the first front passage 34 and which cools air supplied from the first front passage 34, and a second cooling section 38 that faces toward a later-described first rear passage 130 and which cools air supplied from the first rear passage 130. At a boundary portion between the first cooling section 36 and the second cooling section 38, a partitioning means (not shown) is disposed on a boundary portion between the first cooling section 36 and the second cooling section 38 for blocking communication of air between the first cooling section 36 and the second cooling section 38.

On the other hand, as shown in FIG. 2, on the downstream side of the evaporator 18, second front passages 40a, 40b are formed, through which air having passed through the first cooling section 36 is supplied. Upwardly of the second front passages 40a, 40b, a third front passage 42 and a fourth front passage (first passage) 44 are formed in a branching or bifurcated manner. Further, in the second front passages 40a, 40b, a first air mixing damper 46 is rotatably disposed so as to face toward the branching portion of the third front passage 42 and the fourth front passage 44.

Additionally, by rotation of the air mixing damper 46, the blowing condition and blowing rate of cooled air that has passed through the evaporator 18 into the third front passage 42 and the fourth front passage 44 is adjusted. The third front passage 42 is arranged on the forward side (in the direction of arrow A), whereas the fourth front passage 44 is arranged on the rearward side (in the direction of arrow B) of the casing 12. The heater core 20 is disposed on a downstream side of the fourth front passage 44.

Further, on the forward side (in the direction of arrow A) of the third front passage 42, a bypass passage 50 is formed, which extends along the third front passage 42 and supplies air to a later-described mixing section 48 from the downstream side of the evaporator 18, and a bypass damper 52 is disposed on a downstream side of the bypass passage 50. The bypass passage 50 is provided to supply cool air cooled by the evaporator 18 directly to the downstream side under a switching action of the bypass damper 52.

The heater core 20, similar to the evaporator 18, is disposed so as to straddle between the first divided casing 26 and the second divided casing 28. One end of the heater core 20 in the forward direction (the direction of arrow A) of the vehicle is inclined downward at a predetermined angle with respect to the other end thereof in the rearward direction of the vehicle.

Further, the heater core 20 includes a first heating section 54, which faces the fourth front passage 44 and heats air supplied from the fourth front passage 44, and a second heating section 56, which faces a later-described third rear passage (second passage) 148 and heats air supplied from the third rear passage 148.

Figure 4:
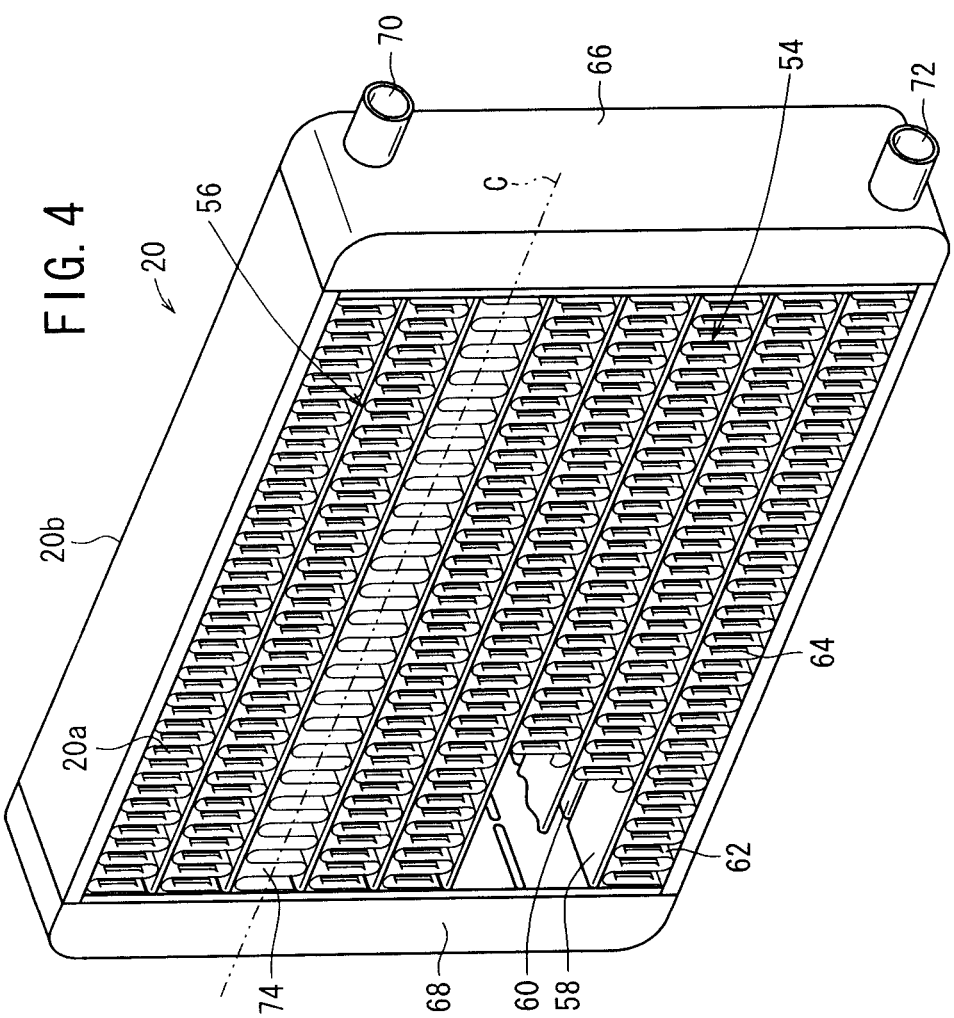
FIG. 4 is a partial cutaway perspective view of a heater core shown in FIG. 2.
Figure 5:
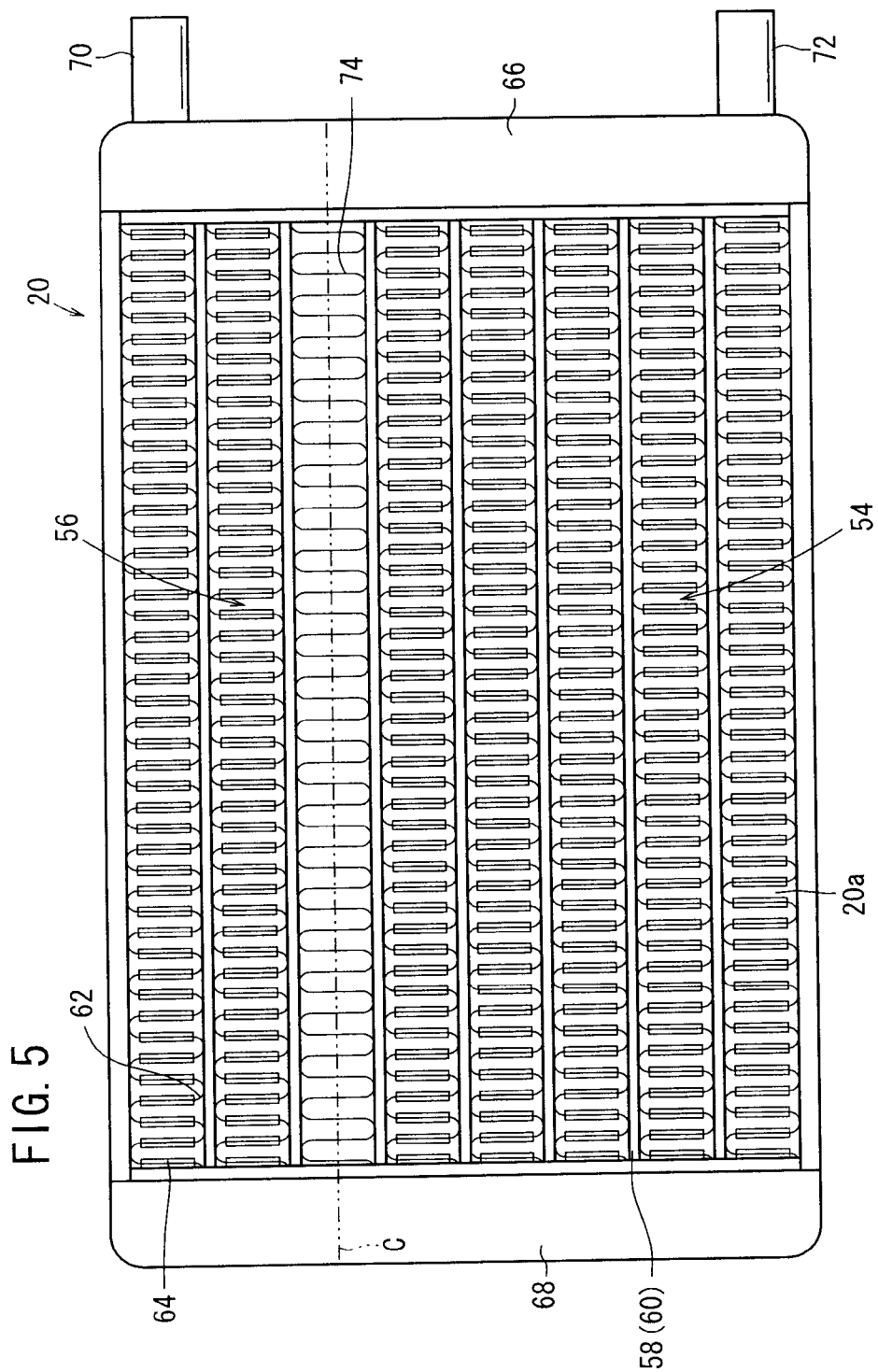
FIG. 5 is an overall plan view of the heater core shown in FIG. 4.

As shown in FIGS. 4 and 5, in the heater core 20, for example, first and second tubes 58, 60 (first and second medium passages) are formed from thin plates of aluminum or the like, and fins 62, which are folded in a serpentine-like undulating (wavy) shape, are disposed respectively between the stacked first and second tubes 58, 60. On the fins 62, a plurality of louvers 64 are formed, which are cut out so as to be inclined at predetermined angles with respect to planar surfaces of the fins 62. By causing hot water (medium) L (see FIG. 6) to flow through the interior of the first and second tubes 58, 60, air that passes through the louvers 64 and flows between the fins 62 is heated by the hot water L and is supplied to the downstream side as heated air. The first and second tubes 58, 60 are arrayed in parallel and arranged in two layers in the thickness direction T of the heater core 20 (see FIG. 4).

The first and second tubes 58, 60 extend a predetermined length in a roughly horizontal direction, and first and second hollow tank portions 66, 68 are connected respectively to both ends thereof. Hot water L that flows through the interior of the first and second tubes 58, 60 is retained in the first and second tank portions 66, 68.

A supply conduit 70 through which hot water L is supplied from the exterior, and a discharge conduit 72 through which the hot water L having circulated through the interior of the heater core 20 is discharged, are connected to the first tank portion 66.

In addition, when the heater core 20 is installed inside the casing 12, as shown in FIG. 2, the discharge conduit 72 is disposed on one end side on the forward side of the vehicle (in the direction of arrow A), whereas the supply conduit 70 is disposed on the other end side on the rearward side of the vehicle (in the direction of arrow B). Further, the discharge conduit 72 is disposed on a front surface 20a side of the heater core 20 facing the fourth front passage 44 on the upstream side thereof, whereas the supply conduit 70 is disposed on a rear surface 20b side of the heater core 20 facing a later-described fourth rear passage 150 on the downstream side of the heater core 20.

More specifically, on the side surface of the first tank portion 66, the supply conduit 70 and the discharge conduit 72 are connected so as to be offset in the thickness direction of the heater core 20. Together therewith, since the interior of the first tank portion 66 is divided at the center thereof in the thickness direction of the heater core 20, the supply conduit 70 and the discharge conduit 72 are set in a non-communicative state within the first tank portion 66 (see FIG. 6).

Further, on the heater core 20, a partitioning fin 74 is disposed at a position on the boundary portion C between the first heating section 54 and the second heating section 56. Communication of air between the first heating section 54 and the second heating section 56 is blocked by means of the partitioning fin 74, which does not include any louvers therein. The means for blocking communication of air between the first heating section 54 and the second heating section 56, however, is not limited to the aforementioned partitioning fin 74.

Figure 6:
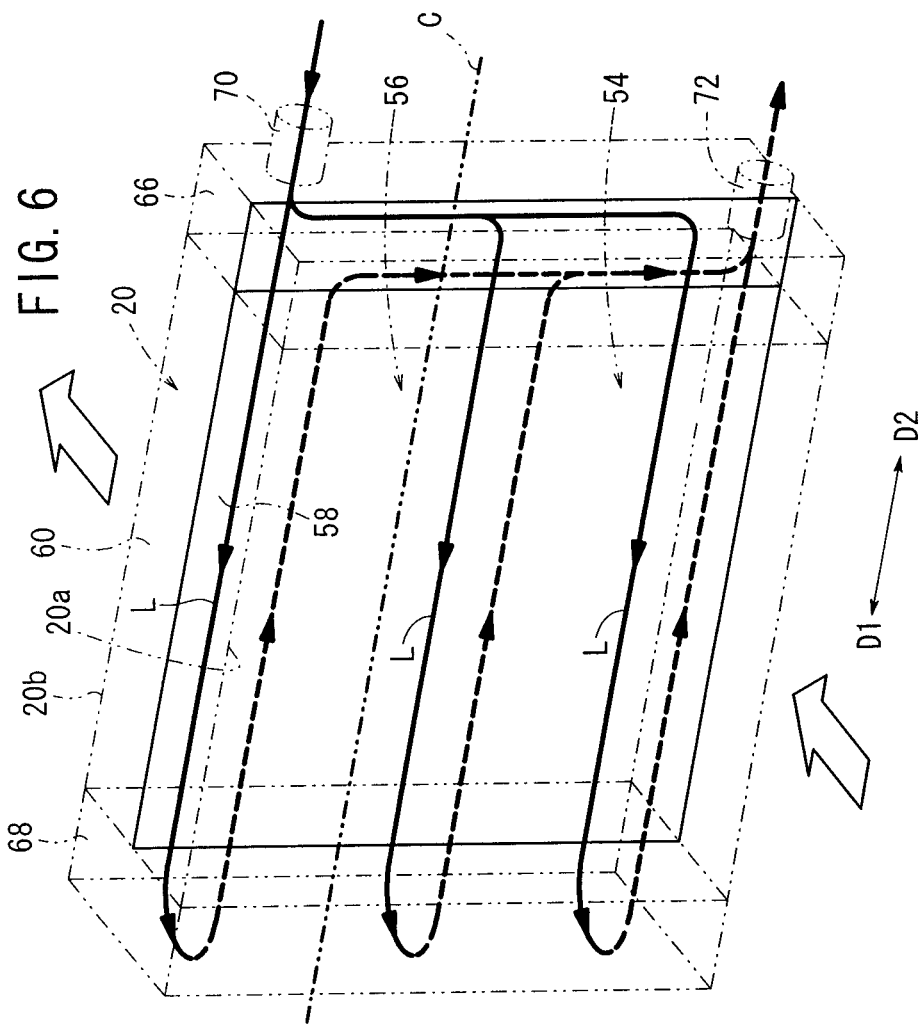
FIG. 6 is an outline perspective view showing the flow of heated water in the heater core of FIG. 2.
Figure 7:
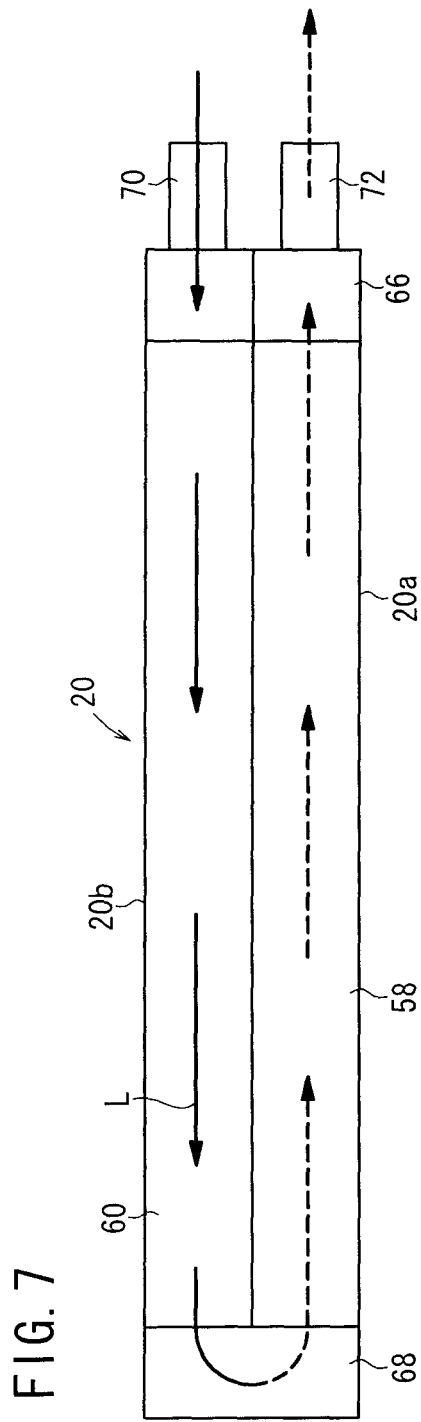
FIG. 7 is an outline upper surface view as observed from the upper surface of the heater core of FIG. 6.

Next, a brief explanation shall be made, with reference to FIGS. 6 and 7, concerning the circulation path of hot water L in the interior of the heater core 20.

First, hot water L introduced from the supply conduit 70 is distributed in a downward direction in the interior of the first tank portion 66, flowing in a horizontal direction toward the side of the second tank portion (communication section) 68 (in the direction of arrow D1) while passing through the plurality of second tubes 60, which is disposed on the rear surface 20b side of the heater core 20. At this time, in the first tank portion 66, because the supply conduit 70 and the discharge conduit 72 are in a non-communicative state, the hot water L does not flow through the first tank portion 66 into the first tubes 58, which are disposed on the front surface 20a side of the heater core 20.

In addition, the hot water L, which has flowed along the second tubes 60 toward the side of the second tank portion 68, after reaching the second tank portion 68, turns at the inside of the second tank portion 68 and flows toward the side of the first tank portion 66 (in the direction of arrow D2) while passing through the plurality of first tubes 58, which are connected to the second tank portion 68.

Lastly, the hot water L, which passes through the first tubes 58 and is introduced into the first tank portion 66, flows to the downstream side in the first tank portion 66 on which the discharge conduit 72 is disposed, whereupon the hot water L is discharged from the discharge conduit 72.

In this manner, after the hot water L, which is introduced from the supply conduit 70 to the interior of the heater core 20, has flowed through the rear surface 20b side horizontally toward the side of the second tank portion 68 (in the direction of arrow D1), the hot water L is circulated (i.e., redirected) in the second tank portion 68 to the side of the front surface 20a, then flows horizontally toward the side of the first tank portion 66 (in the direction of arrow D2), and is discharged from the discharge conduit 72.

Stated otherwise, in the heater core 20, the hot water L supplied from the supply conduit 70, after having flowed from the rear surface 20b side in the heater core 20, i.e., from the downstream side facing a later-described fifth front passage (first passage) 96 and the fourth rear passage (second passage) 150, is made to flow to the front surface 20a side in the heater core 20, i.e., to the upstream side facing the fourth front passage 44 and the third rear passage 148. By circulating the hot water L in this manner, at the side of the front surface 20a (side of the first tubes 58) on the upstream side, hot water L, which is high in temperature and supplied only from the supply conduit 70, is prevented from being cooled by cold air. On the other hand, by causing the hot water L to flow from the rear surface 20b side (side of the second tubes 60) of the heater core 20 through which air that has been heated to a predetermined temperature at the front surface 20a flows, lowering in temperature of the hot water L is suppressed, thus enabling the hot water L to be circulated at a higher temperature state.

Moreover, the air supplied to the heater core 20 from the front surface 20a side facing the fourth front passage 44 and the third rear passage 148 on the upstream side, as a result of passing between the fins 62, becomes heated by the hot water L that flows through the interior of the first and second tubes 58 and 60, and then flows downstream therefrom as heated air.

On the downstream side of the heater core 20, the fifth front passage 96 is formed. The fifth front passage 96 extends in the forward direction, and at a location that merges with a downstream side of the third front passage 42, the mixing section 48 is formed, in which cooled air supplied through the third front passage 42 and warmed air supplied through the fifth front passage 96 are mixed.

A defroster blow-out port 100 opens upwardly of the mixing section 48, and to the side of the mixing section 48, a rearwardly extending sixth front passage 102 is formed.

Further, in the mixing section 48, a defroster damper 104 is rotatably disposed, facing the defroster blow-out port 100. By rotation of the defroster damper 104, the blowing state of air into the defroster blow-out port 100 and the sixth front passage 102 is switched, and the blowing rate thereof is adjusted.

In the sixth front passage 102, first vent blow-out ports 106a, 106b open upwardly, and a vent damper 108 is rotatably disposed facing toward the first vent blow-out ports 106a, 106b, and communicating with a seventh front passage 110, which extends further rearwardly. By rotation of the vent damper 108, the blowing state of air is switched when air is blown from the mixing section 48 to the first vent blow-out ports 106a, 106b and the seventh front passage 110, and further, the blowing rate of the air is capable of being adjusted.

The defroster blow-out port 100 and the first vent blow-out ports 106a, 106b open respectively upwardly of the casing 12. The defroster blow-out port 100 is arranged on a forward side (in the direction of arrow A), whereas the first vent blow-out ports 106a, 106b are arranged on the rearward side (in the direction of arrow B), substantially centrally in the casing 12 with respect to the defroster blow-out port 100.

On a downstream side of the seventh front passage 110, a first heat passage 112 is connected, which extends in the widthwise direction of the casing 12 and blows air through a non-illustrated first heat blow-out port in the vicinity of the feet of passengers in the front seats in the vehicle compartment. Together therewith, a second heat passage 114 is connected, which extends rearwardly of the casing 12 and blows air through a second heat blow-out port (not shown) in the vicinity of the feet of passengers in the middle seats inside the vehicle compartment.

Figure 8:
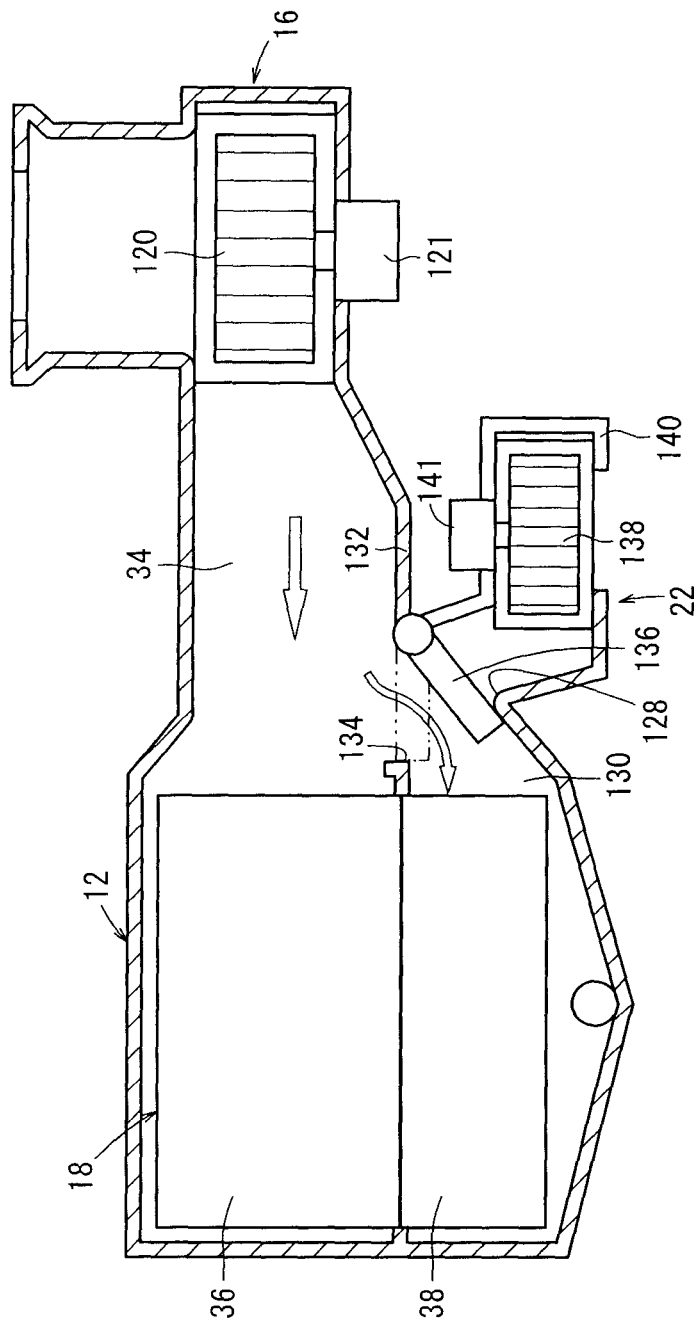
FIG. 8 is an outline structural view showing a casing, first and second blower units and an evaporator that constitute components of the vehicular air conditioning apparatus of FIG. 1.
Figure 9A:
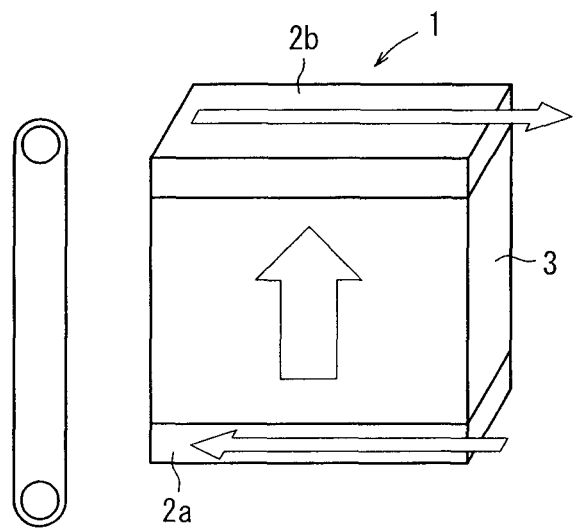
FIG. 9A is an outline schematic view showing the flow of a medium in a heat exchanger according to a conventional technique.
Figure 9B:
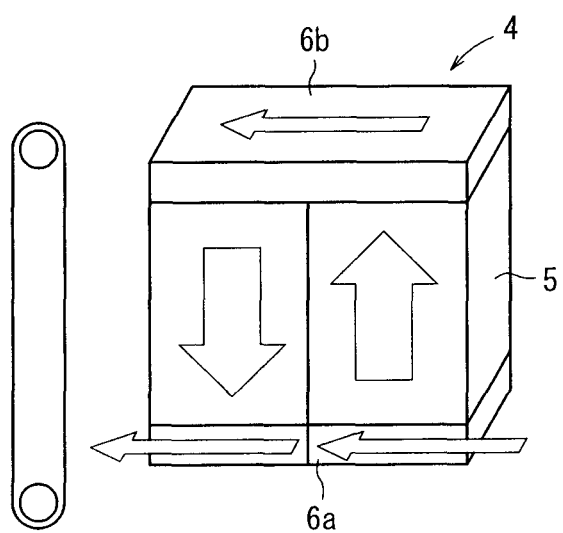
FIG. 9B is an outline schematic view showing the flow of a medium in a different type of heat exchanger according to a conventional technique.

The first blower unit 16, as shown in FIGS. 1 and 8, includes an intake damper 118 in which a duct 116 for introducing external air is disposed in an inlet opening thereof, for carrying out switching of internal and external air, and a first blower fan (first blower) 120 for supplying to the interior of the casing 12 air (external air or internal air) that is taken in from the duct 116 or the like. A blower case 122 in which the first blower fan 120 is accommodated communicates with the interior of the casing 12 via the connection duct 14 connected to the first intake port 32. Rotation of the first blower fan 120 is controlled by a first blower motor 121, which is driven by supplying electrical power thereto.

In this manner, air supplied from the first blower unit 16 is introduced to the interior of the casing 12 through the connection duct 14 and the first intake port 32, and by rotating actions of the first air mixing damper 46, the defroster damper 104, the vent damper 108 and the bypass damper 52, which collectively make up the damper mechanism 24, air is selectively supplied through the first through seventh front passages 34, 40a, 40b, 42, 44, 96, 102, 110, and the bypass passage 50 into the defroster blow-out port 100, the first vent blow-out ports 106a, 106b and the first and second heat passages 112, 114, which are capable of blowing air to the front and middle seats in the vehicle.

On the other hand, on a lower portion of the casing 12, a second intake port 128 through which air is supplied from the second blower unit 22 is formed on a rearward side (in the direction of arrow B) perpendicular to the first intake port 32. The second intake port 128 opens at a position on an upstream side of the evaporator 18 and communicates with the first rear passage 130.

The first rear passage 130 is separated from the first front passage 34 by a first dividing wall 132, and a rotatable ventilation-switching damper (switching damper) 136 is provided between a communication opening 134 formed in the first dividing wall 132 and the second intake port 128. In addition, in the case that a mode is selected in which blowing of air from the second blower unit 22 is halted and blowing of air only from the first blower unit 16 is carried out, by blocking the second intake port 128 by the ventilation-switching damper 136 (i.e., the state shown by the two-dot-dash line in FIG. 2), back flowing of air into the second blower unit 22 can be prevented when a portion of the air supplied from the first blower unit 16 passes through the interior of the evaporator 18 and the heater core 20 and is leaked out to the sides of the first rear passage 130, later-described second rear passages 142a, 142b, the third rear passage 148, and the fourth rear passage 150.

In this case, as shown in FIG. 5, by rotating the ventilation-switching damper 136 to the side of the second intake port 128 and opening the communication opening 134, a portion of the air supplied to the first front passage 34 can be supplied to the side of the first rear passage 130.

As shown in FIG. 8, the second blower unit 22 includes a second blower fan (second blower) 138 that takes in air (internal air) from the vehicle compartment and supplies the intake air to the interior of the casing 12. A blower case 140 in which the second blower fan 138 is accommodated is connected to the second intake port 128 of the casing 12 and communicates with the first rear passage 130. Rotation of the second blower fan 138, similar to the first blower fan 120, is controlled by a second blower motor 141, which is driven by supplying electrical power thereto.

On a downstream side of the first rear passage 130, the second rear passages 142a, 142b are formed to which air that has passed through the second cooling section 38 of the evaporator 18 is supplied. The second rear passages 142a, 142b are separated from the second front passages 40a, 40b by a second dividing wall 144, and the second dividing wall 144 extends to the evaporator 18.

Owing thereto, on a downstream side of the evaporator 18, air that has passed through the first rear passage 130 and flows to the second cooling section 38 of the evaporator 18 does not intermix mutually with air that has passed through the first front passage 34 and flows to the first cooling section 36 of the evaporator 18.

Herein, as shown in FIG. 3, the second rear passages 142a, 142b, the second front passages 40a, 40b and the first vent blow-out ports 106a, 106b are separated respectively on sides of the first and second divided casings 26, 28 about the center plate 30, which is disposed in the center of the casing 12, thereby forming the second rear passage 142a and the second rear passage 142b, the second front passage 40a and the second front passage 40b, and the first vent blow-out port 106a and the first vent blow-out port 106b. Furthermore, a pair of communication switching dampers 146a, 146b, which are capable of switching a communication state between the second rear passage 142a and the second front passage 40a and between the second rear passage 142b and the second front passage 40b, are disposed in the second rear passage 142a and the second rear passage 142b, respectively, wherein one of the communication switching dampers 146a and the other of the communication switching dampers 146b are rotatably controlled separately and independently from each other.

In addition, by rotation of the pair of communication switching dampers 146a, 146b, the second rear passages 142a, 142b for blowing air to the middle seats and rear seats in the vehicle compartment are placed in communication mutually with the second front passages 40a, 40b for blowing air to the front seats in the vehicle compartment. For example, by changing the rotation amount of one of the communication switching dampers 146a and the rotation amount of the other communication switching damper 146b, respectively, the blowing rate and temperature of air that is blown from the first vent blow-out port 106a through the second front passage 40a to the passenger's side in the front seats, and the blowing rate and temperature of air that is blown from the first vent blow-out port 106b through the second front passage 40b to the driver's side in the front seats, can be controlled separately from each other.

The third rear passage 148 facing the heater core 20 is formed on the downstream side of the second rear passages 142a, 142b. One side of the third rear passage 148 opens into the heater core 20, whereas another side thereof opens onto the side of the adjacent fourth rear passage 150. In addition, a second air mixing damper 152, which mixes at a predetermined mixing ratio the cool air and warm air supplied to the third rear passage 148, thereby producing mixed air, is disposed rotatably in the third rear passage 148. The second air mixing damper 152 switches the communication state between the third rear passage 148 and the upstream or downstream side of the fourth rear passage 150, which is connected to the downstream side of the heater core 20.

Consequently, air cooled by the evaporator 18 and supplied to the third rear passage 148, and air heated by the heater core 20 and that flows to the fourth rear passage 150, are mixed at a predetermined mixing ratio inside the fourth rear passage 150 by rotation of the second air mixing damper 152, and are blown out therefrom. Specifically, an intermediate location of the fourth rear passage 150 functions as a mixing section, for mixing cool air and warm air that is blown to the middle seats and rear seats in the vehicle.

The fourth rear passage 150 bends so as to circumvent the other end of the heater core 20 and extends to communicate with fifth and sixth rear passages 154, 156, which branch on a downstream side thereof. A rotatable mode-switching damper 158 is disposed at the branching location of the fifth and sixth rear passages 154, 156. The communication state between the fourth rear passage 150 and the fifth and sixth rear passages 154, 156 is switched by rotation of the mode-switching damper 158.

The fifth and sixth rear passages 154, 156 extend respectively in the rearward direction (the direction of arrow B) of the vehicle. The fifth rear passage 154 communicates with a second vent blow-out port (not shown) for blowing air in the vicinity of the faces of passengers in the middle seats in the vehicle. On the other hand, the sixth rear passage 156 communicates with third and fourth heat blow-out ports (not shown) for blowing air in the vicinity of the feet of passengers riding in the middle and rear seats.

More specifically, air supplied from the second blower unit 22 is introduced to the interior of the casing 12 through the second intake port 128, and under rotating actions of the second air mixing damper 152 and the mode-switching damper 158, which make up the damper mechanism 24, the air passes through the first through sixth rear passages 130, 142a, 142b, 148, 150, 154, 156 and is supplied selectively to the second vent blow-out port, and the third and fourth heat blow-out ports (not shown), which are capable of blowing air to the middle and rear seats in the vehicle.

The aforementioned second through sixth front passages 40a, 40b, 42, 44, 96, 102, the bypass passage 50 and the second rear passages 142a, 142b are disposed respectively so as to straddle between the first divided casing 26 and the second divided casing 28. However, these passages also are divided by the center plate 30, which is disposed in the center of the casing 12.

The vehicular air conditioning apparatus 10 to which the heat exchanger according to the embodiment of the present invention is applied is basically constructed as described above. Next, operations and effects of the invention shall be explained.

First, when operation of the vehicular air conditioning apparatus 10 is started, the first blower fan 120 of the first blower unit 16 is rotated by supplying electrical power thereto, and air (interior or exterior air) that is taken in through the duct 116 or the like is supplied to the first front passage 34 of the casing 12 through the connection duct 14. Simultaneously, air (interior air), which is taken in by rotation of the second blower fan 138 of the second blower unit 22 by supplying electrical power thereto, is supplied to the first rear passage 130 from the blower case 140 while passing through the second intake port 128. In the following descriptions, air supplied to the interior of the casing 12 by the first blower fan 120 shall be referred to as "first air," and air supplied to the interior of the casing 12 by the second blower fan 138 shall be referred to as "second air."

The first air and the second air supplied to the interior of the casing 12 are each cooled by passing respectively through the first and second cooling sections 36, 38 of the evaporator 18, and flow respectively as chilled air to the second front passages 40a, 40b and the second rear passages 142a, 142b, in which the first and second air mixing dampers 46, 152 are disposed.

In the case that a vent mode, for example, is selected by a passenger for blowing air in the vicinity of the faces of passengers, the first air mixing damper 46 is rotated to an intermediate position between the third front passage 42 and the fourth front passage 44, whereupon the first air (cooled air) supplied to the third front passage 42 flows into the mixing section 48, and the first air supplied to the fourth front passage 44 is heated by passing through the heater core 20 to become heated air, and flows into the mixing section 48 through the fifth front passage 96, whereby the cooled first air and the heated first air are mixed together.

The first air (mixed air), which is made up of the cooled air and heated air mixed in the mixing section 48, passes through the sixth front passage 102 and is blown in the vicinity of the faces of passengers in the front seats in the vehicle compartment from the first vent blow-out ports 106a, 106b through the sixth front passage 102, due to the fact that the defroster blow-out port 100 is blocked by the defroster damper 104, and that the opening of the seventh front passage 110 is blocked by the vent damper 108.

On the other hand, the second air mixing damper 152 is rotated to an intermediate position in the interior of the third rear passage 148, whereupon the second air (cooled air) supplied to the third rear passage 148 is heated by passing through the heater core 20 to become heated air, and flows to the downstream side through the fourth rear passage 150. Together therewith, cooled second air is supplied directly into the fourth rear passage 150 from the opening of the third rear passage 148, is mixed together with the heated second air, and flows to the downstream side. In addition, under a switching action of the mode-switching damper 158, the second air (mixed air) passes through the fifth rear passage 154 and is blown in the vicinity of the faces of passengers in the middle seats in the vehicle compartment from the second vent blow-out port (not shown).

Next, in the case that a bi-level mode is selected for blowing air in the vicinity of the faces and feet of passengers in the vehicle compartment, the first air mixing damper 46 is rotated somewhat toward the side of the third front passage 42, whereas the vent damper 108 is placed in an intermediate position, rotated somewhat more to the side of the first vent blow-out ports 106a, 106b as compared to the case of the vent mode. Additionally, the cooled first air that has passed through the evaporator 18 is supplied directly into the mixing section 48 via the bypass passage 50, is mixed in the mixing section 48 with the first air (mixed air) that is supplied through the third and fifth front passages 42, 96, and is blown in the vicinity of the faces of passengers from the first vent blow-out ports 106a, 106b. Further, a portion of the first air (mixed air), which flows to the sixth front passage 102 from the mixing section 48, passes through the sixth and seventh front passages 102, 110 and is supplied respectively to the first and second heat passages 112, 114, whereby the air is blown in the vicinity of the feet of passengers in the front and middle seats in the vehicle compartment from the first and second heat blow-out ports (not shown).

At the same time, the second air mixing damper 152 is rotated somewhat in a direction away from the heater core 20, and the mode-switching damper 158 is rotated from the position closing the sixth rear passage 156 to an intermediate position between the fifth rear passage 154 and the sixth rear passage 156. In addition, as for the second air, heated air heated by the heater core 20 and cooled air, which is supplied to the fourth rear passage 150 through the opening from the third rear passage 148, are mixed together and blown as mixed air from the fifth rear passage 154, through the second vent blow-out port, and in the vicinity of the faces of passengers riding in the middle seats in the vehicle compartment, while also being blown from the sixth rear passage 156, past the third and fourth heat blow-out ports, and in the vicinity of the feet of passengers riding in the middle and rear seats in the vehicle compartment.

Next, in the case that the heat mode is selected for blowing air in the vicinity of the feet of passengers in the vehicle compartment, the first air mixing damper 46 is rotated further to the side of the third front passage 42 compared to the case of the bi-level mode, while the defroster damper 104 and the vent damper 108 are rotated respectively to block the defroster blow-out port 100 and the first vent blow-out ports 106a, 106b. Consequently, the first air (mixed air), which was mixed in the mixing section 48, passes through the sixth and seventh front passages 102, 110 and flows rearwardly to be supplied respectively to the first and second heat passages 112, 114, and is blown in the vicinity of the feet of passengers in the front and middle seats in the vehicle compartment from the non-illustrated first and second heat blow-out ports.

On the other hand, the second air mixing damper 152 is rotated further toward the side of the opening compared to the case of the bi-level mode, and further, the mode-switching damper 158 is positioned to block the fifth rear passage 154. Consequently, the second air (mixed air), which is mixed in the fourth rear passage 150, passes from the fourth rear passage 150, through the sixth rear passage 156, and is supplied to the third and fourth heat blow-out ports, whereby the air is blown in the vicinity of the feet of passengers in the middle and rear seats in the vehicle compartment.

Next, an explanation shall be made concerning a heat-defroster mode for blowing air in the vicinity of the feet of passengers in the vehicle compartment, as well as for blowing air in the vicinity of a front window for eliminating fog (condensation) from the front window. In the event that the heat-defroster mode is selected, the defroster damper 104 is rotated in a direction to separate from the defroster blow-out port 100, so as to assume an intermediate position between the defroster blow-out port 100 and the opening of the sixth front passage 102, and together therewith, the first vent blow-out ports 106a, 106b are blocked by the vent damper 108 (i.e., the condition of the two-dot-dash line shown in FIG. 2).

Consequently, a portion of the first air (mixed air), which is mixed in the mixing section 48, passes through the defroster blow-out port 100 and is blown in the vicinity of the front window of the vehicle, while another portion of the first air flows past the sixth and seventh front passages 102, 110 and is blown in the vicinity of the feet of passengers in the front and middle seats in the vehicle compartment from the first and second heat passages 112, 114 and the first and second heat blow-out ports (not shown).

On the other hand, in the heat-defroster mode, in the case that the second air is blown toward the middle seats and rear seats of the vehicle compartment, since this mode is the same as the heat mode discussed above, detailed explanations thereof shall be omitted.

Lastly, the defroster mode for blowing air only in the vicinity of the front widow for eliminating fog (condensation) from the front window in the vehicle shall be described. In this case, the defroster damper 104 is rotated to separate from the defroster blow-out port 100 while the opening of the sixth front passage 102 is blocked, and the first air (mixed air) is supplied from the mixing section 48 to the opened defroster blow-out port 100 and is blown in the vicinity of the front window in the vehicle. In this case, the defroster mode can be handled solely by blowing first air supplied only from the first blower unit 16, without driving the second blower unit 22.

Next, heating of the first and second air by the aforementioned heater core 20 shall be explained in detail.

First, in the case that air from inside the vehicle (internal air) is drawn in by the first blower unit 16, while similarly air (internal air) from inside the vehicle is drawn in by the second blower unit 22, and air conditioning is carried out thereon (internal air circulation), the temperature T1 of the first air supplied to the first heating section 54 of the heater core 20 from the first blower unit 16 through the fourth front passage 44 and the temperature T2 of the second air supplied to the second heating section 56 of the heater core 20 from the second blower unit 22 through the third rear passage are substantially the same (T1≈T2). Therefore, by passing the first air and the second air through the heater core 20, the first and second air are heated substantially similarly and are supplied downstream.

More specifically, the first air, which is blown to the front and middle seats in the vehicle, and the second air, which is blown to the rear seats in the vehicle, are heated to roughly the same temperature by the hot water L that flows through the interior of the heater core 20, and thus are capable of being blown out at substantially the same temperature into the vehicle compartment.

On the other hand, in a condition where the temperature of air external to the vehicle is low, and in the case that the air outside of the vehicle (external air) is drawn in by the first blower unit 16, whereas air inside the vehicle (internal air) is taken in by the second blower unit 22 and air conditioning is performed thereon, since the temperature T1 of the first air supplied to the first heating section 54 of the heater core 20 through the fourth front passage 44 is lower than the temperature T2 of the second air supplied to the second heating section 56 of the heater core 20 from the third rear passage 148 (T1<T2), the temperature of the first air that passes through the first heating section 54 and is blown toward the front and middle seats in the vehicle becomes somewhat lower than the temperature of the second air that passes through the second heating section 56 and is blown toward the middle and rear seats in the vehicle.

In this case, as shown in FIG. 6, in the heater core 20, because the hot water L supplied from the supply conduit 70 flows in parallel and not perpendicularly with respect to the boundary portion C between the first and second heating sections 54 and 56, hot water L that is cooled by passage of the low temperature first air in the first heating section 54 does not flow toward the side of the second heating section 56. Stated otherwise, the hot water L, which has been cooled by the first air in the first heating section 54, flows through the first and second tubes 58, 60 only inside a range of the first heating section 54, and is circulated (i.e., redirected) to the discharge conduit 72.

As a result, even under a condition in which the temperature T1 of the external first air drawn in by the first blower unit 16 is lower than the temperature T2 of the second air T2 (internal air) inside the vehicle, cooling of the second air caused by the lower temperature of the first air is avoided. Consequently, the second air can be heated to a desired temperature by the hot water L that is circulated through the first and second tubes 58, 60 of the second heating section 56 and blown out to the rear seats in the vehicle compartment.

In the foregoing manner, according to the embodiment of the present invention, in an environment where the outside temperature is low, when air (external air) is introduced by the first blower unit 16, heated by the heater core 20 and blown out to the front and middle seats in the vehicle as heated air, since hot water L is cooled by the first air, which passes through the first heating section 54 of the heater core 20, is not circulated to the side of the second heating section 56, cooling of the second air that is heated upon passing through the second heating section 56, caused by hot water L that is cooled by the first air, can reliably be avoided.

As a result, even in an environment of low outside temperature, the temperature of the second air, which is blown out to the rear seats in the vehicle, can be maintained at a desired temperature, and the comfort of passengers in the vehicle compartment can be enhanced.

Stated otherwise, even in the case that the first air, which is drawn into the vehicle by the first blower unit 16, is low in temperature, the influence of the temperature of the first air on the temperature of the second air blown out toward the rear seats in the vehicle is suppressed, whereby the second air is capable of being blown out unaffectedly to the rear seats in the vehicle at a desired heated temperature.

The heat exchanger for use in a vehicular air conditioning apparatus according to the present invention is not limited to the above-described embodiments, and it is a matter of course that various modified or additional structures could be adopted without deviating from the essence and gist of the invention as set forth in the appended claims.

What is claimed is:

1. A vehicular air conditioning apparatus comprising:
    a casing including first and second passages through which air flows;
    a damper mechanism for switching a flow state of the air in the first passage and the second passage, and first and second blowers for supplying air respectively to the first and second passages;
    a heat exchanger is disposed in the interior of the casing so as to straddle between the first passage and the second passage, for thereby heating and supplying the air, the heat exchanger comprising:
    first medium passages facing toward an upstream side of the first and second passages and through which a medium flows through the interior thereof;
    second medium passages, which are parallel to the first medium passages and face toward a downstream side of the first and second passages, and through which the medium flows through the interior thereof;
    a communication section disposed at ends of the first and second medium passages, for establishing communication between the first medium passages and the second medium passages;
    a first tank disposed at the other ends of the first and second medium passages;
    fins between the first medium passages and between the second medium passages, the fins having a plurality of louvers;
    a supply conduit that supplies the medium to the heat exchanger and a discharge conduit that discharges the medium from the heat exchanger, the supply conduit and the discharge conduit being disposed on the first tank, the axes of the supply conduit and the discharge conduit being parallel to the first and second medium passages;
    a first heat exchanger section, which performs heat exchange on the air that flows through the first passage;
    a second heat exchanger section, which performs heat exchange on the air that flows through the second passage; and
    a partitioning member disposed inside the heat exchanger between the fins and between the first and second medium passages at a boundary portion between the first heat exchanger section and the second heat exchanger section, for blocking communication of the air inside the heat exchanger between the first heat exchanger section and the second heat exchanger section, the partitioning member comprises no louvers,
    wherein the partitioning member is disposed in parallel with the first and second medium passages, has a wavy shape in a cross section parallel to the axes of the supply conduit and the discharge conduit and parallel to the axes of the first and second medium passages,
    an area of the second heat exchanger section is different from an area of the first heat exchanger section,
    the medium is supplied from the second medium passages and is circulated into the first medium passages through the communication section, and
    the fins have a wavy shape in cross sections parallel to the axes of the supply conduit and the discharge conduit and parallel to the axes of the first and second medium passages.

2. The vehicular air conditioning apparatus according to claim 1, wherein the partitioning member has the same wavy shape in the cross section parallel to the axes of the supply conduit and the discharge conduit and parallel to the axes of the first and second medium passages as the fins.

3. The vehicular air conditioning apparatus according to claim 1, wherein every peak of the wavy shape of the cross section of the partitioning member is in contact with the first and second medium passages.

4. The vehicular air conditioning apparatus according to claim 1, wherein the boundary portion is between the first and second medium passages of the first heat exchanger section and the first and second medium passages of the second heat exchanger section, the boundary portion does not comprise fins that have louvers.

5. The vehicular air conditioning apparatus according to claim 1, wherein the supply conduit is disposed on the first tank in the second passage and the discharge conduit is disposed on the first tank in the first passage.

6. The vehicular air conditioning apparatus according to claim 1, wherein the first blower is controlled by a first blower motor, the second blower is controlled by a second blower motor, and the first blower is controlled independently from the second blower.

7. A vehicular air conditioning apparatus comprising:
    a casing including first and second passages through which air flows;

a damper mechanism for switching a flow state of the air in the first passage and the second passage, and first and second blowers for supplying air respectively to the first and second passages;

a heat exchanger is disposed in the interior of the casing so as to straddle between the first passage and the second passage, for thereby heating and supplying the air, the heat exchanger comprising:

first medium passages facing toward an upstream side of the first and second passages and through which a medium flows through the interior thereof;

second medium passages, which are parallel to the first medium passages and face toward a downstream side of the first and second passages, and through which the medium flows through the interior thereof;

a communication section disposed at ends of the first and second medium passages, for establishing communication between the first medium passages and the second medium passages;

fins between the first medium passages and between the second medium passages, the fins having a wavy shape in cross sections parallel to the axes of the supply conduit and the discharge conduit and parallel to the axes of the first and second medium passages and having a plurality of louvers;

a first heat exchanger section, which performs heat exchange on the air that flows through the first passage;

a second heat exchanger section, which performs heat exchange on the air that flows through the second passage;

a partitioning member disposed inside the heat exchanger between the fins and between the first and second medium passages at a boundary portion between the first heat exchanger section and the second heat exchanger section, for blocking communication of the air in the heat exchanger between the first heat exchanger section and the second heat exchanger section, the partitioning member comprises no louvers, the partitioning member having a wavy shape in a cross section parallel to the axes of the supply conduit and the discharge conduit and parallel to the axes of the first and second medium passages;

a first hollow tank portion, which is connected to one end of each of the first and second medium passages and divided at a center thereof in a thickness direction of the heat exchanger;

a second hollow tank portion, which is the communication section and is connected to another end of each of the first and second medium passages; and a medium supply conduit that supplies the medium to the heat exchanger and a medium discharge conduit that discharges the medium from the heat exchanger which are connected to the first hollow tank, the axes of the supply conduit and the discharge conduit being parallel to the first and second medium passages, wherein the heat exchanger is inclined in the casing so that a height position of the medium supply conduit is different from a height position of the medium discharge conduit, the medium is supplied from the second medium passage and is circulated into the first medium passage through the communication section, the partitioning member has the same wavy shape in the cross section parallel to the axes of the supply conduit and the discharge conduit and parallel to the axes of the first and second medium passages as the fins, every peak of the wavy shape of the cross section of the partitioning member is in contact with the first and second medium passages, the boundary portion is between the first and second medium passages of the first heat exchanger section and the first and second medium passages of the second heat exchanger section, the supply conduit is disposed on the first hollow tank portion in the second passage and the discharge conduit is disposed on the first hollow tank portion in the first passage, and the first blower is controlled by a first blower motor, the second blower is controlled by a second blower motor, and the first blower is controlled independently from the second blower.

8. The vehicular air conditioning apparatus according to claim 7, wherein the height position of the medium supply conduit is higher than the height position of the medium discharge conduit.

9. The vehicular air conditioning apparatus according to claim 7, wherein the partitioning member is disposed in the heat exchanger so that an area of the first heat exchanger section is wider than an area of the second heat exchanger section.

10. The vehicular air conditioning apparatus according to claim 7, wherein the partitioning member is disposed in parallel with the first and second medium passages, and in parallel with the medium supply conduit and the medium discharge conduit.

11. The vehicular air conditioning apparatus according to claim 7, wherein the boundary portion does not comprise fins that have louvers.

12. A vehicle air conditioning apparatus comprising:

a casing including first and second passages through which air flows:

a damper mechanism for switching a flow state of the air in the first passage and the second passage, and first and second blowers for supplying air respectively to the first and second passages;

a heat exchanger is disposed in the interior of the casing so as to straddle between the first passage and the second passage, for thereby heating and supplying the air, the heat exchanger comprising:

first medium passages facing toward an upstream side of the first and second passages and through which a medium flows through the interior thereof;

second medium passages, which are parallel to the first medium passages and face toward a downstream side of the first and second passages, and through which the medium flows through the interior thereof;

a communication section disposed at ends of the first and second medium passages, for establishing communication between the first medium passages and the second medium passages;

a first tank disposed at the other ends of the first and second medium passages;

fins between the first medium passages and between the second medium passages, the fins having plurality of louvers;

a supply conduit that supplies the medium to the heat exchanger and a discharge conduit that discharges the medium from the heat exchanger, the supply conduit and the discharge conduit disposed on the first tank, the axes of the supply conduit and the discharge conduit being parallel to the first and second medium passages;

a first heat exchanger section, which performs heat exchange on the air that flows through the first passage;

a second heat exchanger section, which performs heat exchange on the air that flows through the second passage; and a partitioning member disposed inside the heat exchanger between the fins and between the first and second medium passages at a boundary portion between the first heat exchanger section and the second heat exchanger section, for blocking communication of the air inside the heat exchanger between the first heat exchanger section and the second heat exchanger section, the partitioning member comprises no louvers;

wherein the partitioning member is disposed in parallel with the first and second medium passages, has a wavy shape in a cross section parallel to the axes of the supply conduit and the discharge conduit and parallel to the axes of the first and second medium passages, an area of the second heat exchanger section is different from an area of the first heat exchanger section, the medium is supplied from the second medium passages and is circulated into the first medium passages through the communication section, the fins have a wavy shape in cross sections parallel to the axes of the supply conduit and the discharge conduit and parallel to the axes of the first and second medium passages, and the supply conduit and the discharge conduit are disposed at one end and another end of the first tank in a longitudinal direction thereof and the partitioning member is interposed between the supply conduit and the discharge conduit.

* * * * *